US006831133B2

(12) United States Patent
Kennedy et al.

(10) Patent No.: US 6,831,133 B2
(45) Date of Patent: Dec. 14, 2004

(54) ADDITION OF UNSATURATED HYDROCARBONS TO POLY(VINYL CHLORIDE) AND FUNCTIONALIZATION THEREOF

(75) Inventors: Joseph P. Kennedy, Akron, OH (US); Zhengjie Pi, Akron, OH (US)

(73) Assignee: The University of Akron, Akron, OH (US)

(*) Notice: Subject to any disclaimer, the term of this patent is extended or adjusted under 35 U.S.C. 154(b) by 291 days.

(21) Appl. No.: 09/732,967

(22) Filed: Dec. 8, 2000

(65) Prior Publication Data

US 2002/0061973 A1 May 23, 2002

Related U.S. Application Data

(63) Continuation-in-part of application No. 09/604,309, filed on Jun. 27, 2000.

(51) Int. Cl.$^7$ .................... C08L 51/00; C08F 259/00
(52) U.S. Cl. ...................... 525/313; 525/317
(58) Field of Search ............................ 525/313, 317

(56) References Cited

U.S. PATENT DOCUMENTS

| 2,384,975 A | | 9/1945 | Sparks et al. | |
|---|---|---|---|---|
| 2,612,493 A | | 9/1952 | Sparks et al. | |
| 3,291,782 A | | 12/1966 | Anderson et al. | |
| 3,296,230 A | | 1/1967 | Gateff et al. | |
| 3,330,886 A | * | 7/1967 | Riou et al. ............ | 522/120 |
| 3,435,020 A | | 3/1969 | Olson | |
| 3,472,830 A | | 10/1969 | Baxter et al. | |
| 3,804,919 A | | 4/1974 | Schrage et al. | |
| 3,896,091 A | | 7/1975 | Fabris et al. | |
| 4,032,594 A | | 6/1977 | Serratore et al. | |
| 4,363,903 A | | 12/1982 | Yamane et al. | |
| 4,605,704 A | | 8/1986 | Eastman et al. | |
| 5,104,956 A | | 4/1992 | Waymouth | |
| 5,208,304 A | | 5/1993 | Waymouth | |
| 5,260,389 A | | 11/1993 | Resconi et al. | |
| 5,387,664 A | | 2/1995 | Kawasaki et al. | |
| 5,571,869 A | * | 11/1996 | Lee et al. ............ | 525/322 |
| 5,578,743 A | | 11/1996 | Ho et al. | |

FOREIGN PATENT DOCUMENTS

| EP | 0 507 468 | | 10/1992 |
|---|---|---|---|
| GB | 1174323 | * | 7/1967 |

OTHER PUBLICATIONS

*Encyclopedia of PVC*, vol. 1, 2$^{nd}$ Ed., Marcel Dekker, Inc. New York, (1986); pp. 570–605.
*Heat Degradation of PVC Stabilized by Treatment with Alkylaluminum Compounds*, Gupta and Kennedy, *Makromol.Sci.–Chem.*, A12(10), (1978) pp. 1407–1426.

*The Discoloration of PVC–I, Correlation Between the Dehydrochlorination and Discoloration of PVC*, Levai and Ocskay, *European Polymer Journal*, vol. 10, Pergamon Press (1974), pp. 1121–1125.
*Living Carbocationic Polymerization. XXX. One–Pot Synthesis of Allyl–Terminated Linear and Tri–Arm Star Polyisobutylenes, and Epoxy– and Hydroxy–Telechelics Therefrom*, Ivan and Kennedy, *Journal of Polymer Science*: Part A: Polymer Chemistry, vol. 28, (1990), pp. 89–104.
*Determination of Tertiary Chlorine Structures in PVC*, Buruiana, Alrinei, Robila and Caraculacu, *Polymer Bulletin 3*, (1980), pp. 267–271.
*Graft Modification of PVC and Related Reactions*, Thame and Lundberg, *Journal of Polymer Science*: Part A–1, vol. 10, (1972), pp. 2507–2525.
*Determination of Unsaturated Structures in PVC by Means of Fourier Transform $^1H$–NMR Spectroscopy*, Caraculacu and Bezdadea,*Journal of Polymer Science*: Polymer Chemistry Edition, vol. 15, (1977), pp. 611–620.
*Determination of Labile Chlorine in PVC with the Aid of Phenolysis Reaction*, Buruiana, Robila and Caraculacu, *European Polymer Journal*, vol. 13, (1977) pp. 21–24, Pergamon Press.
*New Approaches to the Study of Labile Structures in PVC by Phenolysis*, Muangos, Martinez, and Millán, *European Polymer Journal*, vol. 18, (1982), pp. 731–734, Pergamon Press.
*New Telechelic Polymers and Sequential Copolymers by Polyfunctional Initiator–Transfer Agents (Inifers). III. Synthesis and Characterization of a Poly(α–Methylstyrene–b–Isobutylene–b–α–Methylstyrene)*, Kennedy and Smith, *Journal of Polymer Science*: Polymer Chemistry Edition, vol. 18, 1539–1546 (1980).
*New Telechelic Polymers and Sequential Copolymers by Polyfunctional Initiator–Transfer Agents (Inifers). XVII. Epoxy and Aldehyde Telechelic Polyisobutylenes*, Kennedy, Chang, and Francik, *Journal of Polymer Science*: Polymer Chemistry Edition, vol. 20, 2809–2817 (1982).
*Thermal Stability of Graft Modifications of PVC and Related Materials*, Abbas, *Journal of Polymer Science*: Polymer Chemistry Edition, vol. 13, 59–68 (1975).

(List continued on next page.)

*Primary Examiner*—Jeffrey Mullis
(74) *Attorney, Agent, or Firm*—Roetzel & Andress

(57) ABSTRACT

The preparation of allylated poly(vinyl chloride) by utilizing an allyltrialkylsilane in the presence of Friedel-Crafts acids is disclosed. The pendant allyl groups can be further reacted through various functionalization reactions to contain end groups such as epoxy and hydroxyl. Alternatively, an unsaturated group can be added to poly(vinyl chloride) utilizing a diene also in the presence of a Friedel-Crafts acid. These pendant groups can also be reacted to contain functional end groups such as hydroxyl and epoxy. In yet a further embodiment, the functionalized end groups such as pendant —OH groups of both the allylated and diene grafted poly (vinyl chloride) are further reacted with other monomers or polymer chains which thus results in a poly(vinyl chloride) chain having pendant monomers or polymers. These compositions are useful as compatibilizers for poly(vinyl chloride) and various other resins.

12 Claims, 2 Drawing Sheets

OTHER PUBLICATIONS

*Cationic Grafting: The Synthesis, Characterization and Physical Properties of Poly (Vinyl Chloride–g–Isobutylene)*, Kennedy and Davidson, Polymer Prepr., Am. Chem. Soc., Div. Polymer Chem., (1974) 15, 209–213.

*Poly(vinyl Chloride–g–Butyl Rubber)*, Kennedy and Davidson, *Journal of Polymer Science*: Polymer Chemistry Edition, vol. 14, 153–157 (1976).

*Cationic Polymerization of Isobutylene from Poly(vinyl Chloride): Physical Properties of Poly(vinyl Chloride–g–Isobutylene)*, Kennedy and Davidson, *Journal of Applied Polymer Science*: Applied Polymer Symposium 30, 51–72 (1977).

*Cationic Polymerization of Isobutylene from Poly (vinyl Chloride): Physical Properties of Poly(vinyl Chloride–g–Isobutylene)*, Kennedy and Davidson, *Journal of Applied Polymer Science*: Applied Polymer Symposium 30, 13–49 (1977).

*Mechanism and Microstructure in the Free–Radical Polymerization of vinyl Chloride: Head to Head Addition Revisted*, Stames and Wojciechowski, *Makromol. Chem. Macromol. Symp.* 70/71, 1–11 (1993).

*New Structured and Mechanistic Chemistry in Polymerizations of Vinyl Chloride Initiated by Di–tert–alkylmagnesiums*, Benedikt et al., *Macromolecules*, 30, (1997), 10–21.

*Intramolecular Hydrogen Transfers in Vinyl Chloride Polymerization: Routes to Doubly Branched Structures and Internal Double Bonds*, Stames et al., *Macromolecules*, (1998) 31, 1508–1517.

*Thermal Degradation of some Model Compounds for Polyvinylchloride*, Airinei et al., *Polymer Bulletin*, (Berlin) (1982), 7, 465–471.

*Formation of Anomalous Structures in PVC and Their Influence on the Thermal Stability: 2. Branch Structures and Tertiary Chlorine*, Hjertberg and Sorvik, *Polymer*, (1983), 24, Jun., 673–684.

*Poly(Vinyl Chloride–g–Styrene): Synthesis, Characterization, and Physical Properties*, Kennedy and Nakao, *Journal of Macromol. Sci.–Chem.*, A12(2), pp. 197–207 (1978).

*Structural Defects in Polyvinylchloride–I, Internal Unsaturation as Initiation Sites for Dehydrochlorination*, Braun, Michel and Sonderhof, *European Polymer Journal*, vol. 17, pp. 49–56, (1981), Pergamon Press.

*Monte Carlo Simulation of the Formation of Irregular Structures in Poly (vinyl chloride)*, Guyot, *Macromolecules*, (1986), 19, 1090–1096.

*Unsaturated End Groups in PVC–III*, Bezdadea, Buruiana and Carculacu, *European Polymer Journal*, (1971), vol. 7, pp. 1649–1660, Pergamon Press.

*On the Mechanism of the Polymerization of Poly(vinyl chloride)*, Caraculacu, Buruiana and Robila, *Journal of Polymer Science*: Polymer Chemistry Edition, vol. 16, 2741–2745 (1978).

*Working Party on Defects in the Molecular Structure of PVC and Their Relation to Thermal Stability: General Conclusions*, Guyot, *Journal of Vinyl Technology*, (1985), 7(2), 92–94.

*Effects of Stabilizers During the Thermal of PVC. II. Correlation of Thermal Stability, Discoloration, and Stabilizer Exhaustion*, Czako, *Plasty Kauc.*, (1975), 12(9), 259–261.

*Investigation of Thermal Degradation of PVC in the Solid State*, Levai, Ocskay, Szebeni, *Journal Macromol. Sci., Chem* (1978), A12(3), 467–477.

*Colorimetric Characterization of the Discoloration of Thermally Treated PVC*, Thielert, Schliemann, Figge, Agnew, *Makromol. Chem.* (1975), 47(1), 129–40.

*Formation of Anomalous Structures in PVC and Their Influence on Thermal Stability–I, Endgroup Structures and Labile Chlorine Substituted by Phenol*, Hjertberg and Soervik, *Journal Macromol. Sci., Chem.*, (1982), A17(6), 983–1004.

*Encyclopedia of Polymer Science and Engineering*, vol. 11, D. Freitag et al., John Wiley & Sons, pp. 648–718, 1988.

*Thermal Stability of Graft Modifications of PVC and Related Materials*, ABBÅS et al., *Journal of Polymer Science*, Polymer Chemistry Edition, vol. 13, (1975), pp. 59–68, John Wiley & Sons, Inc.

\* cited by examiner

ADDITION OF UNSATURATED HYDROCARBONS TO POLY(VINYL CHLORIDE) AND FUNCTIONALIZATION THEREOF

CROSS REFERENCE

This application is a continuation in part of U.S. patent application Ser. No. 09/604,309 filed Jun. 27, 2000 for Allylation of Poly(Vinyl Chloride) and Further Functionality of Allyl Groups.

FIELD OF THE INVENTION

The present invention relates to the preparation of allylated poly(vinyl chloride) by utilizing an allyltrialkylsilane in the presence of Friedel-Crafts acids. The pendant allyl groups can be further reacted through various functionalization reactions to contain groups such as epoxy, hydroxyl, and silyl. A method for determination of the labile chlorine content of poly(vinyl chloride) is also disclosed.

A further embodiment of the present invention relates to poly(vinyl chloride) grafted with an unsaturated hydrocarbon such as a diene to form a plurality of pendant hydrocarbon oligomers on the poly(vinyl chloride) chain, each having an unsaturated end group. A method for producing the poly(vinyl chloride) grafted dienes and the addition of various functional end groups to the oligomers is also set forth. In yet a further embodiment of the present invention, the functionalized end groups such as pendant —OH groups of both the allylated and diene grafted poly(vinyl chloride) are further reacted with other monomers or polymer chains which thus results in a poly(vinyl chloride) chain having pendant polymers. These compositions are useful as compatibilizers for poly(vinyl chloride) and various other resins.

BACKGROUND OF THE INVENTION

During polymerization of vinyl chloride to poly(vinyl chloride) (PVC), in addition to regular —CH$_2$CHCl— repeat units, a very small quantity of "active" or "labile" chlorines also arises. Although the concentration of these active chlorines is very modest, their presence decisively influences the ultimate thermal, oxidative, and chemical stability of this commercially important resin. The literature is replete with references addressing details of this problem such as set forth in *Thermal Degradation of Some Model Compounds for Poly(vinyl chloride)*, Airinei, Buruiana, Robila, Vasile and Caraculacu, Polymer Bulletin 7, 465–471, (1982); *Formation of Anomalous Structures in PVC and Their Influence on the Thermal Stability:1 End-group structures and Labile Chlorine Substituted by Phenol*, Hjertberg, Soervik, *J. Macromol. Sci*., Chem. 1982 A17(6), 983–1004; and *Formation of Anomalous Structures in PVC and Their Influence on the Thermal Stability:2. Branch Structures and Tertiary Chlorine*, Hjertberg and Sorvik, *Polymer*, Vol. 24, June, 1983, pp. 673–684.

It has been found that the active chlorines in poly(vinyl chloride), in conjunction with certain Friedel-Crafts coinitiators, are efficient initiators for the grafting of cationically active monomers (isobutylene, styrene) from poly(vinyl chloride), and that the thermal stability of the grafted poly(vinyl chloride) increases significantly over that of unmodified poly(vinyl chloride). See for example *Cationic Grafting: The Synthesis, Characterization and Physical Properties of Poly(Vinyl Chloride-g-Isobutylene)*, Kennedy and Davidson, *J. Macromol. Sci. Chem.*, A12(2), pp. 197–207 (1978); *Poly(vinyl chloride-g-Styrene): Synthesis, Characterization, and Physical Properties*, Kennedy and Nakao, *J. Macromol. Sci.*-Chem., A12(2), pp 197–207 (1978); *Thermal Stability of Graft Modifications of PVC and Related Materials*, Abbas, *Journal of Polymer Science*: Polymer Chemistry Edition, Vol. 13, 59–68 (1975); *New Telechelic Polymers and Sequential Copolymers by Polyfunctional Initiator-Transfer Agents (Inifers). XVII. Epoxy and Aldehyde Telechelic Polyisobutylenes*, Kennedy, Chang, and Francik, *Journal of Polymer Science*: Polymer Chemistry Edition, Vol. 20, 2809–2817 (1982); and *New Telechelic Polymers and Sequential Copolymers by Polyfunctional Initiator-Transfer Agents (Inifers). III. Synthesis and Characterization of a Poly(α-Methylstyrene-β-Isobutylene-β-α-Methylstyrene)*, Kennedy and Smith, *Journal of Polymer Science*: Polymer Chemistry Edition, Vol. 18, 1539–1546 (1980).

The active chlorine content in poly(vinyl chloride) has been determined by several groups by using FTIR and UV spectroscopy, and selective reactions in conjunction with IR- or UV-active reagents. The values reported in the literature cover quite a broad range (i.e. anywhere from 0.04 to 2.3 mol %), and the discrepancy cannot be explained only by the differences between the samples used. This uncertainty prompted us to develop an analytical method for the determination of the minute concentrations of active chlorines in poly(vinyl chloride) starting material.

SUMMARY OF THE INVENTION

The preparation of the allylated poly(vinyl chloride) is described herein. The active chlorines in poly(vinyl chloride) can be replaced by pendant allyl groups (—CH$_2$CH=CH$_2$) by the use of allyltrialkylsilane in the presence of Friedel-Crafts acids. The thermal stability of allylated poly(vinyl chloride) is significantly superior to that of the starting material. NMR analytical results of the allylated poly(vinyl chloride) can be utilized to determine the active chlorine content in poly(vinyl chloride). The allyl groups of the allylated poly(vinyl chloride) can be used in various functionalization reactions such as epoxidation, hydroboration, oxidation, and hydrosilation to respectively yield epoxy, hydroxyl, and silyl functional groups.

The poly(vinyl chloride) can also be cationically reacted with an unsaturated hydrocarbon such as a diene to produce a plurality of grafted oligomers pendant from the poly(vinyl chloride) backbone containing a plurality of unsaturated end groups such as allylic groups. The allylic or unsaturated end groups of the oligomeric branch can also be reacted to form various functional groups such as hydroxyl, silyl, or epoxy end groups. The various pendant functional end groups such as hydroxyl can be further reacted through various reactions to contain other oligomers or polymers such as various polyethers, polyesters, polyurethanes, polyamides, or polycarbonates. The resulting product can be described as a poly(vinyl chloride) chain having pendant or grafted oligomers or polymers, which are useful as compatibilizers for mixtures of poly(vinyl chloride) and various polymers.

DETAILED DESCRIPTION OF THE INVENTION

Figure 1:
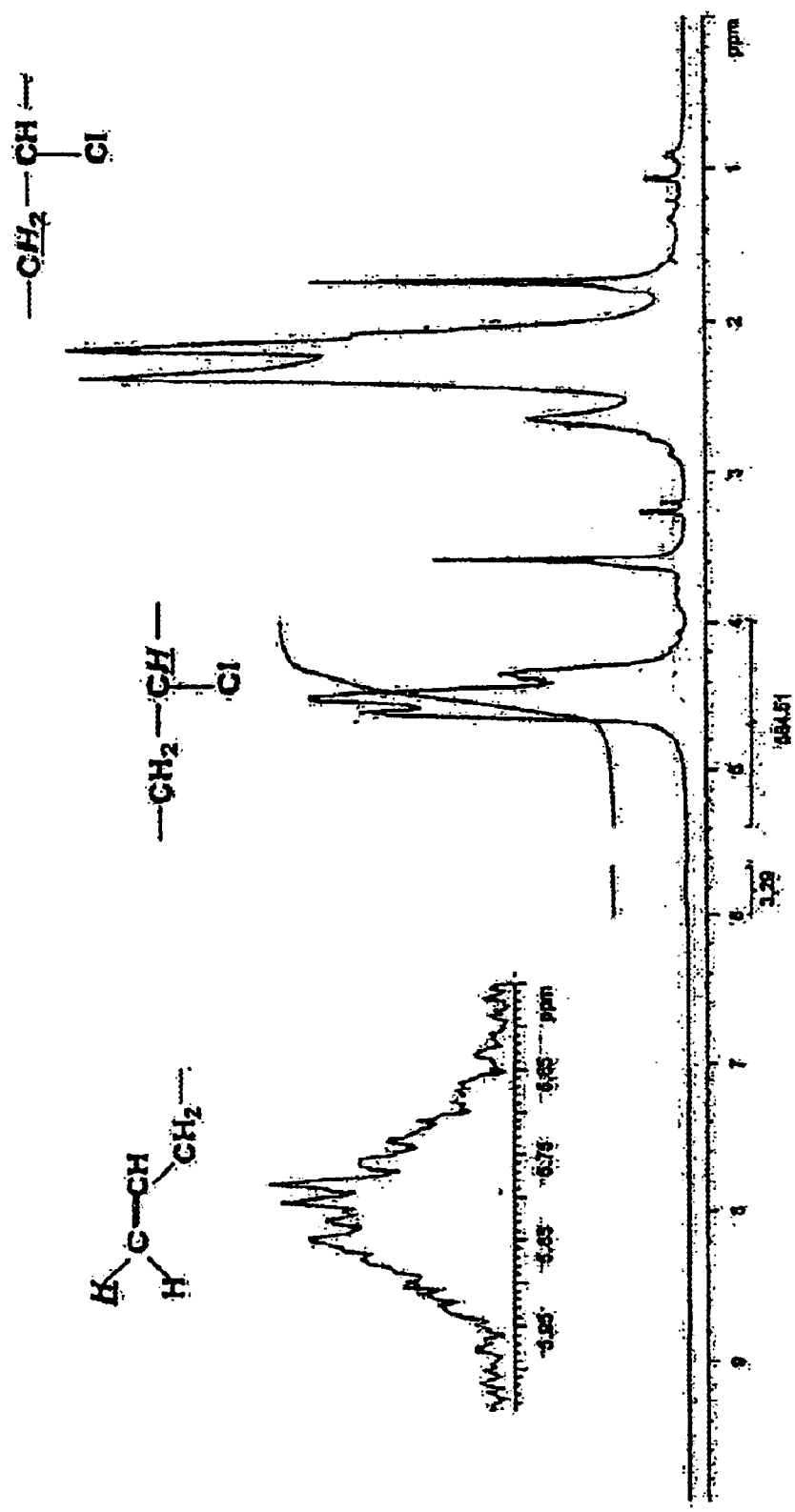
FIG. 1 is an $^1$H NMR spectrum of a representative allylated poly(vinyl chloride) obtained with TiCl$_4$.

The poly(vinyl chloride) utilized by the present invention is well known to the art and to the literature. The polymerization of vinyl chloride monomer to poly(vinyl chloride) in addition to the regular —$CH_2CH(Cl)$— repeat units, also inherently results in the presence of a very small quantity of active or labile chlorines. The presence of labile chlorines influence the thermal, oxidative, and chemical stability of the poly(vinyl chloride) resin. The labile chlorines in poly(vinyl chloride) can be substituted with allyl groups as described hereinbelow by the use of allyltrialkylsilane in the presence of Friedel-Crafts acids.

The poly(vinyl chloride) polymer or resin as utilized in this invention is preferably a homopolymer of vinyl chloride. In addition, small amounts of a copolymer derived from comonomers may be utilized in conjunction with the vinyl chloride monomers in preparing the polymer. Some preferred commoners include, but are not limited to, vinyl acetate, α-methylvinyl chloride, vinylsterate, vinylbenzoate, vinylidene chloride, and vinyl bromide, acrylonitrile, acrylates and methacrylates, or combinations thereof. When a comonomer is utilized with the poly(vinyl chloride) of the present invention, the comonomer ranges generally from about 0.01 to about 10 or 20 parts by weight, desirably from about 0.05 to about 5 parts by weight, and preferably from about 0.5 to about 3 parts by weight based upon the total weight of the comonomer and poly(vinyl chloride). The present invention also extends and pertains to chlorinated poly(vinyl chloride) i.e., C-PVC. The preparation of C-PVC is well known to the art and to the literature. C-PVC can be utilized in place of the homopolymer of vinyl chloride, or blended therewith, or copolymerized with the comonomers as stated above.

Poly(vinyl chloride) contains, in addition to "normal" secondary chlorines, labile allylic and/or tertiary chlorines as well. The thermal instability of poly(vinyl chloride) is due to the presence of a small but critical amount of labile chlorine with end-allylic structure (I), internal-allylic structure (II), and tertiary structure (III) wherein $R^o$ is a poly(vinyl chloride) chain branch. It is the labile chlorine that provides active sites for the above-noted allylation.

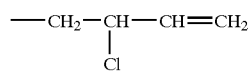

(I)

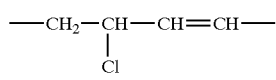

(II)

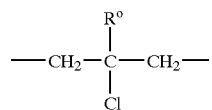

(III)

The quantitative method utilizes the above described allyl group replacement of the active chlorines of poly(vinyl chloride). The method makes use of the reaction between allyltrialkylsilane and cationic species generated from cationicaliy active chlorines by a Friedel-Crafts acid. The driving force of this substitution is the high chlorine affinity of silicone to the counter anion formed with the Friedel-Crafts acid.

By utilizing the above described allylation method, the allyl group content, and consequently the cationically active chlorine content in poly(vinyl chloride), can be quantitatively determined by NMR spectroscopy, more specifically $^1$H NMR spectroscopy.

$^1$H NMR spectroscopy is carried out on the allylated poly(vinyl chloride). The characteristic resonances of the allyl function, i.e., the terminal protons in the —$CH_2$—CH=$CH_2$ groups, which are generally found in the 5.65 to 5.95 ppm range, are integrated and correlated with the resonances of the C—H group, which are generally found around 4.5 ppm, to give the amount of allyl group content, and thus also the active chlorine content.

In order to find the actual amount of active chlorines per poly(vinyl chloride) chain, the amount of allyl chlorine content per chain in the virgin (pre-allylated) poly(vinyl chloride) polymer must be measured by NMR spectroscopy and subtracted from the number of allyl groups per chain measured from the allylated poly(vinyl chloride) polymer. This is generally because poly(vinyl chloride) always contains a variety of "abnormal" structures, for example:

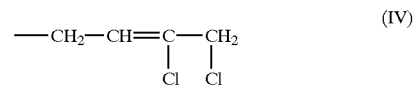

(IV)

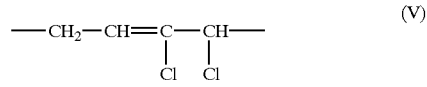

(V)

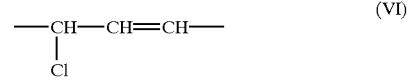

(VI)

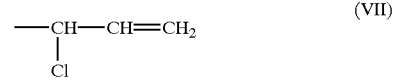

(VII)

The characteristic $^1$H NMR resonances of these allyl chlorine structures are in the same range as those of the allyl function of the present invention. The reactive C—Cl bonds in these structures can be replaced with relatively stable C—C bonds by allylation, but the chemical shifts of the resonances will appear in the same range. The position of these abnormal allyl resonances remains constant and will not affect the determination of active chlorines. The abnormal structures contribute generally about 1.5 allyl groups in poly(vinyl chloride) in the Geon 110×377 poly(vinyl chloride). The cationically active chlorines in mol % is obtained by dividing the number of active chlorines per poly(vinyl chloride) with the number average degree of polymerization of the poly(vinyl chloride) used, i.e., 585 with the Geon 110×377 resin utilized. The cationically active chlorine content of the Geon resin determined by our method was 0.27% to 0.31 mol % of the total chlorine content, which is equivalent to about 1.6 to about 1.8 cationically active chlorines per poly(vinyl chloride) chain.

Hereinafter, poly(vinyl chloride) refers to either a homopolymer of vinyl chloride, or chlorinated poly(vinyl chloride) (C-PVC), or copolymers thereof; a blend of poly(vinyl chloride) with a C-PVC or with a C-PVC copolymer, or a blend of a poly(vinyl chloride) copolymer and a chlorinated poly(vinyl chloride) polymer or copolymer.

The poly(vinyl chloride) polymers or copolymers utilized by the present invention are widely available commercially from such sources as the Geon Company as Geon® Resin 110×377. The poly(vinyl chloride) can be used in its purchased state or can also be purified before use, such as by precipitation from THF into excess methanol, which is then dried, as in a vacuum oven at room temperature, before use.

The allylation of poly(vinyl chloride) should be carried out in a reaction vessel fitted with a stirrer or other agitating means and heating and/or cooling means. Preferably, the allylation is conducted in the presence of an inert gas such as nitrogen, helium, argon, neon, and the like, in order to allylate under controlled, inert or non-reactive conditions.

Desirably, the poly(vinyl chloride) is placed into solution by using appropriate polar halogenated hydrocarbon solvents containing a total of from 1 to 6 or 12 carbon atoms, such as 1,2-dichloroethane, methylene chloride, methyl chloride, chlorobenzene, dichlorobenzene, and vinyl chloride, or combinations thereof. Preferred solvents include methylene chloride, and methyl chloride. Enough solvent is utilized so that poly(vinyl chloride) is present in solution in an amount generally from about 0.5 to about 5.0, desirably from about 0.6 to about 3.0, and preferably from 0.75 to about 1.25 percent by weight based on the total weight of poly(vinyl chloride) and solvent.

The solution of poly(vinyl chloride) is cooled in the reactor vessel. Suitable temperatures generally range from about minus 20° C. to about minus 90° C., desirably from about minus 30° C. to about minus 80° C., and preferably from about minus 50° C. to about minus 70° C.

Once cooled, an allyltrialkylsilane is added to the solution. Allyltrialkylsilanes generally have the formula:

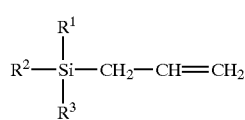

(VIII)

wherein $R^1$, $R^2$, and $R^3$, independently, are alkyls (linear or branched) having from 1 to about 5 carbon atoms. $R^1$, $R^2$, and $R^3$ are preferably methyl groups and hence, the preferred allyltrialkylsilane is allyltrimethylsilane (ATMS).

The allyltrialkylsilane is utilized in an amount generally from about 0.01 to about 10 moles and preferably from about 0.05 to about 5 moles per liter of solution.

Alternatively, a substituted allyltrialkylsilane can be used in place of the allyltrialkylsilane or in combination therewith. The substituted allyltrialkylsilane generally has the formula

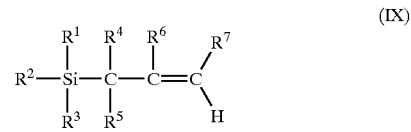

(IX)

wherein $R^1$, $R^2$, and $R^3$, independently, is an alkyl (linear or branched) having from 1 to about 5 carbon atoms, wherein $R^4$, $R^5$, $R^6$, and $R^7$, independently, can be hydrogen atoms, or an alkyl (linear or branched) having from 1 to 10 carbon atoms. The substituted allyltrialkylsilanes can be utilized in the amounts stated above for the allyltrialkylsilanes.

One or more Friedel-Crafts acids are also added to the solution. Such Friedel-Crafts acids include, but are not limited to, titanium tetrachloride, diethyl aluminum chloride, boron trichloride, ethyl aluminum dichloride, tin tetrachloride, aluminum trialkyl, wherein each alkyl, independently, has from 1 to 6 carbon atoms, and the like. The amount of Friedel-Crafts acid utilized generally is from about $1\times10^{-3}$ to about $1\times10^{-1}$ moles per liter, desirably from about $1\times10^{-2}$ to about $8\times10^{-2}$ moles per liter, and preferably from about $2\times10^{-2}$ to about $6\times10^{-2}$ moles per liter of solution.

The reaction solution is mixed and allowed to proceed generally from about 5 minutes to about 60 minutes, desirably from about 10 minutes to about 45 minutes, and preferably from about 15 minutes to about 30 minutes, thus forming the allylated poly(vinyl chloride) of the present invention. The reaction is then terminated with an alcohol having from 1 to 5 carbon atoms or an amine utilizing an excess to precipitate the allylated poly(vinyl chloride). Suitable alcohols include methanol, ethanol, and propanol. Methanol and ethanol are preferred.

The solution is then evaporated, leaving the allylated poly(vinyl chloride). If desired, the allylated poly(vinyl chloride) can be purified by re-dissolving in tetrahydrofuran, cyclohexanone, or any other suitable poly(vinyl chloride) solvent, and centrifuged for any desirable amount of time, such as approximately one hour, to remove residues such as small amounts of metal oxide.

While not being bound by theory, it is believed that the mechanism of the reaction is as follows:

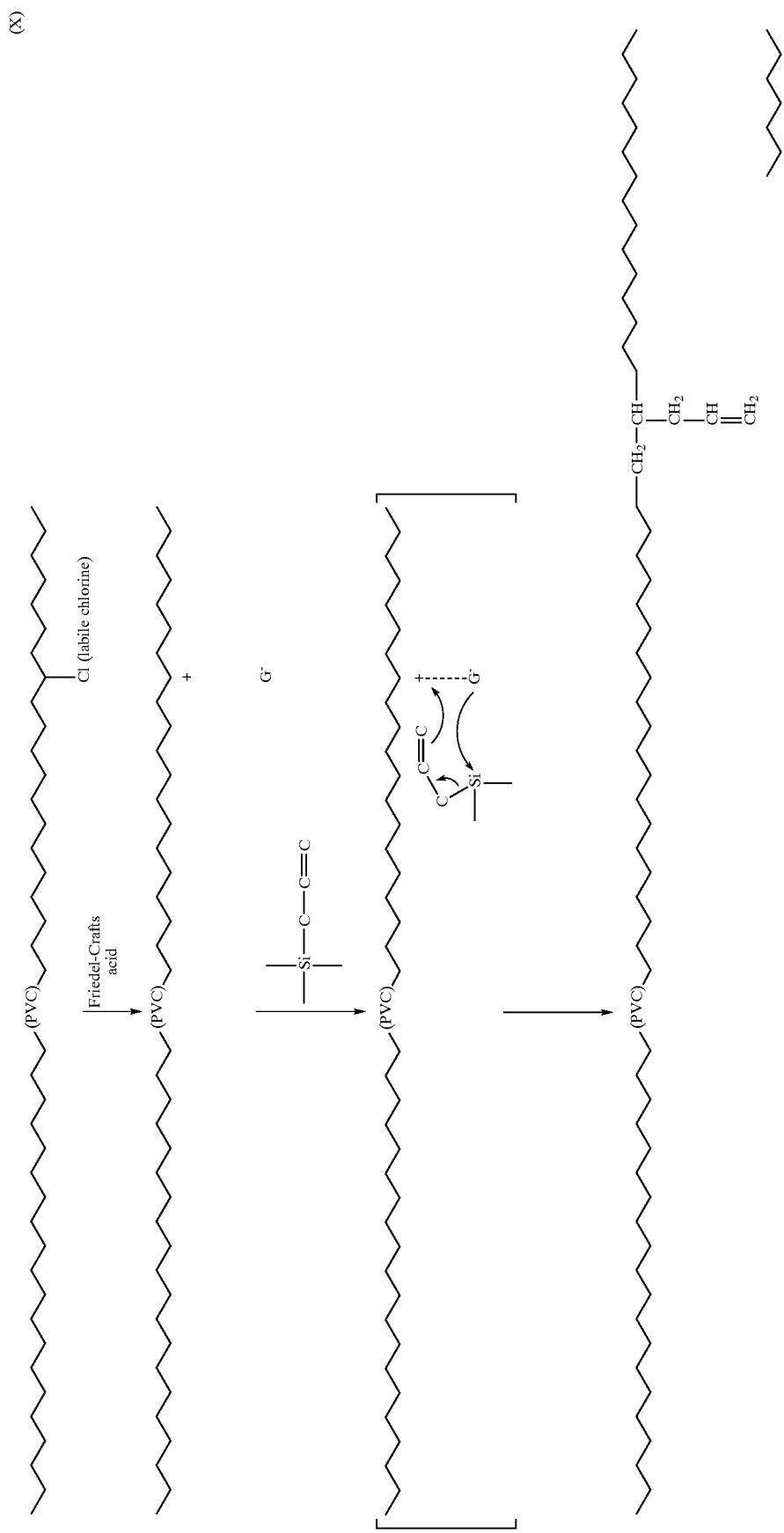

wherein G⁻ is $TiCl_5^-$, $Et_2AlCl_2^-$, $BCl_4^-$, or $SnCl_5^-$.

NMR spectroscopy was used to confirm the structure of the allylated poly(vinyl chloride), with the allylated portion having the formula

   or

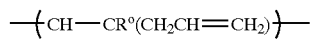

wherein $R^o$ is a poly(vinyl chloride) chain branch. The allyl groups are incorporated onto the Geon 110×377 polymer in an average amount from about 1.6 to about 1.8 groups per polymer chain. Generally, allyl groups can be incorporated onto poly(vinyl chloride) polymers or copolymers in an average amount generally from about 1.0 to about 3.0, desirably from about 1.3 to about 2.5, and preferably from about 1.4 to about 2.0 groups per polymer chain. The degree of polymerization of the poly(vinyl chloride) ranges generally from about 100 to about 1,500 or greater, desirably from about 150 to about 1,000, and preferably from about 200 to about 900.

The presence of an allyl group on the poly(vinyl chloride), derived from reacting the labile chlorines thereon, adds significantly to the thermal stability of the poly(vinyl chloride) chain and also permits various functional groups to be added to the poly(vinyl chloride), thus permitting the grafting of additional compounds thereon, such as other polymers and the like. Functional groups which can be prepared from the allylated poly(vinyl chloride) include epoxy, hydroxyl and silyl.

Accordingly, the allylated poly(vinyl chloride) compositions of the present invention can also be classified as a reactive poly(vinyl chloride) intermediate that can be further functionalized through the allyl groups utilizing reactions such as epoxidation, hydroboration, and hydrosilylation.

Epoxidation of allylated poly(vinyl chloride) can be accomplished as follows. A desired amount of allylated poly(vinyl chloride) is dissolved by any of the solvents as noted hereinabove. Enough solvent is utilized so that poly(vinyl chloride) is present in solution in an amount generally from about 0.1 to about 10, desirably from about 0.5 to about 5, and preferably from about 1 to about 2 percent by weight based on the total weight of poly(vinyl chloride) and solvent. A peracid, i.e., a molecule comprising a —COOOH group, such as m-chloroperbenzoic acid, peracetic acid, perpropionic acid, trichloroperacetic acid, trifluoroperacetic acid, or a combination thereof, is then added to the allylated poly(vinyl chloride) solution. Preferred peracids are m-chloroperbenzoic acid and peracetic acid. The peracid is added in amounts from about 2 to about 10 times in excess of stoichiometric ratio of the allylated poly(vinyl chloride). The reaction is carried out under normal atmospheric conditions. The reaction temperature may be generally from about −20° C. to about 80° C., desirably from about −10° C. to about 50° C., and preferably the reaction is run at ambient room temperature, i.e., from about 10 to about 30° C. The reaction is allowed to proceed while preferably stirred, generally for about 10 minutes to about 4 hours and desirably from about 20 minutes to 1 hour.

The product is precipitated with an alcohol having from about 1 to about 5 carbon atoms, such as methanol. The precipitated product can be washed sequentially with 5% aqueous sodium bicarbonate, distilled water and methanol. The solvent is evaporated and the product is dried, such as in a vacuum oven, at room temperature.

While not being limited to theory, an overall reaction mechanism is as follows:

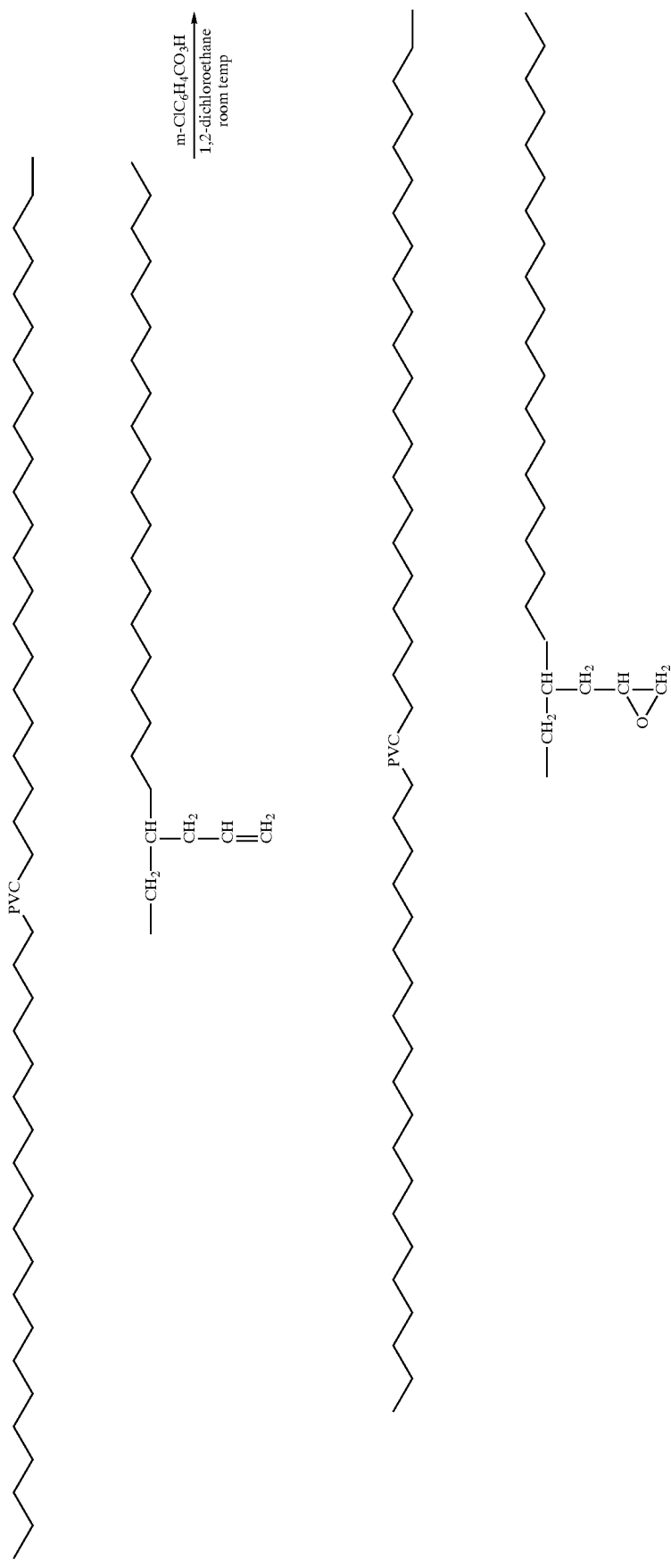

The structure of the epoxidized poly(vinyl chloride) was investigated by $^1$H NMR spectroscopy. However, the characteristic resonances of the pendant propylene oxide group could not be identified because of the overlap of the epoxy methylene protons with the various protons in poly(vinyl chloride). The complete disappearance of the olefin resonances in the range of the allyl group (5.65 to 5.95 ppm), together with the characteristic $^{13}$C NMR resonances, however, indicates essentially quantitative epoxidation.

The epoxidized poly(vinyl chloride) can be further reacted as known to one of ordinary skill in the art, through the pendant propylene oxide groups thereon. Various end groups which can be added to the pendant epoxy function include hydroxyl groups, ether groups, amine groups and amide groups. Example reaction schemes include the following:

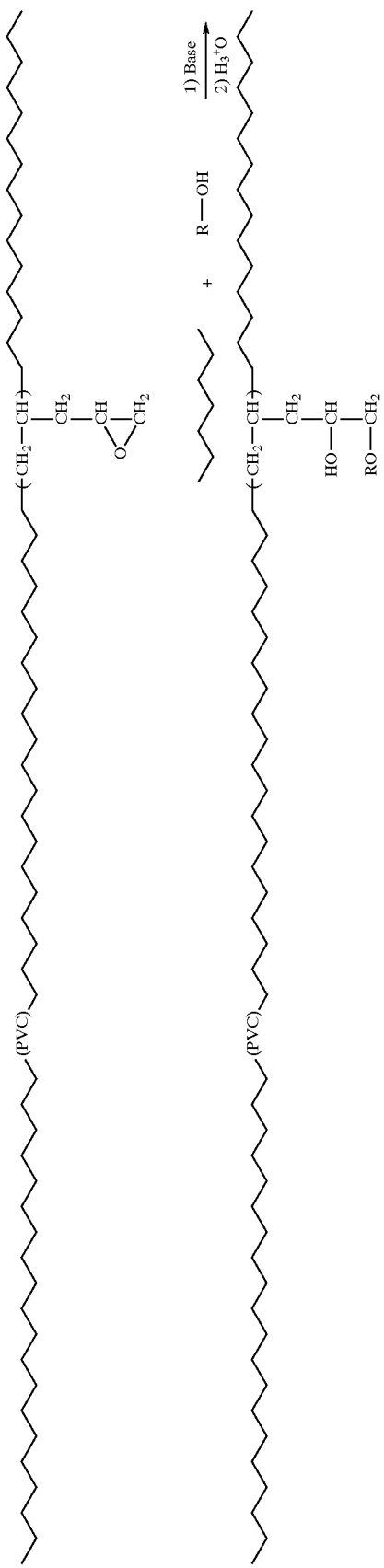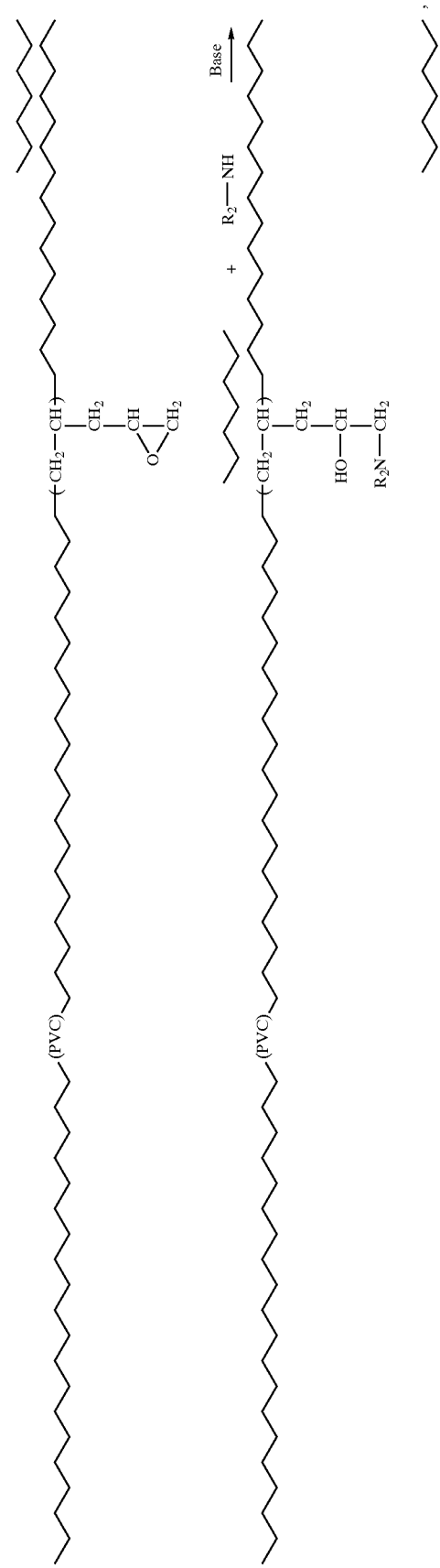

wherein R and $R_2$, independently, are alkyl groups having from 2 to about 18 carbon atoms and/or any polymer fitted with the above-mentioned functionality.

These and other reactions of epoxy groups can be found in "Organic Chemistry", $2^{nd}$ Edition, John McMurry, Brooks/Cole Publishing Company, 1988.

Generally, by utilizing various functionalization processes, hydroboration or hydrosilation of the allylated poly(vinyl chloride) can be carried out, generally yielding, respectively, the following structures:

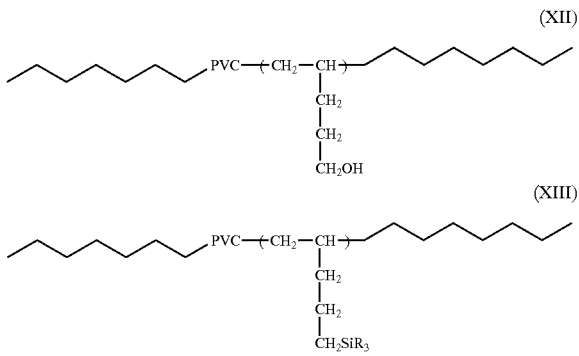

(XII)

(XIII)

wherein each R, independently, is an alkyl (linear or branched) or a substituted alkyl group having from 1 to about 10 carbon atoms.

The allylated poly(vinyl chloride) can be converted to hydroxylated poly(vinyl chloride) through hydroboration followed by oxidation. A desired amount of allylated poly (vinyl chloride) is placed into solution with any of the solvents noted hereinabove. The allylated poly(vinyl chloride) is present in solution in any desired amount such as from about 0.1 to about 10, desirably from about 0.5 to about 6, and preferably from about 1 to about 3 percent by weight based on the total weight of poly(vinyl chloride) and solvent as set forth above, e.g. 1,2-dichloroethane. The hydroborating agents utilized are generally boron compounds, having a general formula $R_{3-x}BH_x$ wherein each R, independently, is an alkyl group having from 0 to about 10 carbon atoms and x is 1, 2 or 3, such as $BH_3$ with specific examples including 9-BBN (9-borabicyclo [3,3,1] nonane) and a boron hydride complex with THF (tetrahydrofuran). The amount of the boron containing compound added to the reaction mixture is generally a stoichiometric excess relative to the pendant allyl groups such as from about 1 to about 20 and desirably from about 1 to about 10 molar equivalent. The reaction is carried out in an inert atmosphere, such as in the various inert gasses as stated hereinabove, with nitrogen being preferred. Reaction temperatures generally range from about minus 30° C. to about 45 or 50° C. with from about minus 10° C. to about 20° C. being desired. The reaction mixture is allowed to react for a sufficient amount of time, which can vary depending upon the reaction temperature and particular reactants. For example, a reaction mixture can be reacted at room temperature with 9-BBN or at 0° C. with the $BH_3$.THF, from one to about several hours. Subsequently, an oxidizing agent such as hydrogen peroxide is added in an alkaline medium which will react with the reactant to form a hydroxyl group. The oxidation reaction is carried out at temperatures generally below 45° C. and is allowed to proceed for a sufficient amount of time ranging from minutes to a few hours. Water is added and the formed aqueous phase is separated from the organic layer phase. The organic layer phase containing the grafted oligomer is washed several times with water and dried over a drying agent or desiccant such as magnesium sulfate. After filtration of the product, the solvent is evaporated as by heating and the hydroxylated poly(vinyl chloride) is dried under vacuum at room or elevated temperatures.

Silyl groups can be added to the allylated poly(vinyl chloride) through hydrosilation. A desired amount of allylated poly(vinyl chloride) is placed into solution with any of the solvents noted hereinabove. The allylated poly(vinyl chloride) is present in solution in any desired amount such as from about 0.1 to about 10, desirably from about 0.5 to about 6, and preferably from about 1 to about 3 percent by weight based on the total weight of poly(vinyl chloride) and solvent as set forth above, e.g. 1,2-dichloroethane. A few drops of Karstedt's catalyst and excess $R_3SiH$ is added to the solution. Each R, independently, can be an alkyl group having from 1 to about 10 carbon atoms or an alkoxy group having from about 1 to about 10 carbon atoms. The amount of the silicon containing compound added to the reaction mixture is generally a stoichiometric excess relative to the pendant allyl group such as from about 1 to about 20 and desirably from about 1 to about 10 molar equivalent. The solution was refluxed preferably from about 0.5 to about 6 hours. The hydrosilated poly(vinyl chloride) was precipitated with an alcohol, washed sequentially with hexane, distilled water, and an alcohol, and dried in a vacuum oven at room or elevated temperature.

The following examples serve to illustrate, but not to limit, the present invention.

Allylated PVC. Allylation of poly(vinyl chloride) was carried out in a stainless steel dry box equipped with a thermostated bath under a dry nitrogen atmosphere. A 1000 mL flask, equipped with a mechanical stirrer, was charged with 500 mL $CH_2Cl_2$ solution of poly(vinyl chloride) (1 wt % Geon 110×377 PVC), and was cooled to −70° C.

ATMS (allyltrimethylsilane) (0.1 mol/L) and Friedel-Crafts acid ($TiCl_4$ or $Et_2AlCl$, $4.5 \times 10^{-2}$ mol/L) were added, and the charge was stirred for 45 minutes. Methanol (about 20 mL) was added to terminate the reaction. The allylated poly(vinyl chloride) was precipitated with excess methanol, re-dissolved in THF, and centrifuged for 1 hour to remove metal oxide residues. The solvent was evaporated and the allylated poly(vinyl chloride) was dried in a vacuum oven at room temperature.

Characterization. $^1H$ and $^{13}C$ NMR spectra were recorded by a Varian 300 spectrometer.

FIG. 1. $^1H$ NMR spectrum of a representative allylated poly(vinyl chloride) obtained with $TiCl_4$.

Allylations were carried out by the use of $TiCl_4$ and $Et_2AlCl$ in $CH_2Cl_2$ at −70° C. FIG. 1 shows the $^1H$ NMR spectrum, together with the assignments, of a representative allylated poly(vinyl chloride) obtained with $TiCl_4$. Integrating and correlating the characteristic resonances of the allyl function (i.e., the terminal protons in the —$CH_2CH=CH_2$ group) in the 5.65 to 5.95 ppm range, with the resonances at about 4.5 ppm (associated with the —$CH_2CH(Cl)$— group), gives the amount of cationically active chlorine content.

Representative results are shown in TABLE I.

TABLE I

Cationically active chlorine content determined by allylation*:

| Friedel-Crafts acids | Number of allyl group after allylation per PVC chains | Active chlorines per PVC chain | Active chlorines mole % |
|---|---|---|---|
| TiCl$_4$ | 3.3 | 1.8 | 0.31 |
| Et$_2$AlCl | 3.1 | 1.6 | 0.27 |

*Allyl chlorine content of virgin PVC: 1.5 per PVC chain (by NMR)

The second column in TABLE I specifies the total number of allyl groups in our poly(vinyl chloride) after allylation. The third column shows active chlorines per poly(vinyl chloride) chain (i.e. the difference between the number of allyl groups in allylated and virgin poly(vinyl chloride)). The fourth column gives the cationically active chlorines in mol % obtained by dividing the value in the third column with 585 (i.e., the number average degree of polymerization of the poly(vinyl chloride) used). According to these results, the reaction between the carbocationic species and ATMS is essentially quantitative.

Epoxidation of Allylated PVC. Epoxidation of allylated poly(vinyl chloride) was carried out with excess m-chloroperbenzoic acid in 1,2-dichloroethane solution. Thus, a 500 mL flask equipped with a magnetic stir bar was charged with 250 mL of a 1,2-dichloroethane solution of allylated poly(vinyl chloride) (1.5 wt %) and m-chloroperbenzoic acid (0.75 g), and the charge was stirred for 4 hours at room temperature. The product was precipitated with methanol, washed sequentially with 5% aqueous sodium bicarbonate, distilled water and methanol, and dried in a vacuum oven at room temperature.

Hydroxylation of PVC. Hydroborations with 9-BBN and BH$_3$.THF can be carried out in a three-necked flask equipped with stirrer and dropping funnel. A solution of poly(vinyl chloride) (2 wt %) in 1,2-DCE was added drop-wise under nitrogen atmosphere into excess 9-BBN or BH$_3$.THF charges. After 5 hours of stirring at room temperature with 9-BBN or at 0° C. with BH$_3$.THF, stoichiometric amounts of 3N NaOH and subsequently 30% H$_2$O$_2$ were added drop-wise while the reaction temperature was maintained below 45° C. The mixture was allowed to react for 2 hr, and 1,2-DCE was added, then water saturated with potassium carbonate was added. The organic layer was separated, washed several times with water, and dried over magnesium sulfate. After filtration, the solvent was evaporated and the hydroxylated poly(vinyl chloride) was dried under vacuum at room temperature.

The thermal stability and extent of discoloration of heated films was studied in order to show allylated poly(vinyl chloride) offers improved thermal properties over virgin poly(vinyl chloride).

Heating of poly(vinyl chloride) invariably leads to discoloration and the extent of discoloration is a sensitive measure of the extent of thermal degradation of the resin. The thermal instability of poly(vinyl chloride) is due to the presence of active chlorines, predominantly tertiary and allylic chlorines, and the replacement of these with relatively more stable C—C bonds leads to improved thermal properties.

TABLE II

Comparison of thermal stability of virgin poly(vinyl chloride) and allylated poly(vinyl chloride):

| | Temperature (° C.) at % Weight loss (in air by TGA) | | | | | | |
|---|---|---|---|---|---|---|---|
| | 2% | 5% | 10% | 20% | 30% | 40% | 50% |
| POLY(VINYL CHLORIDE | 247 | 261 | 268 | 274 | 279 | 288 | 305 |
| Allylated PVC | 262 | 276 | 290 | 302 | 310 | 318 | 332 |

Figure 2:
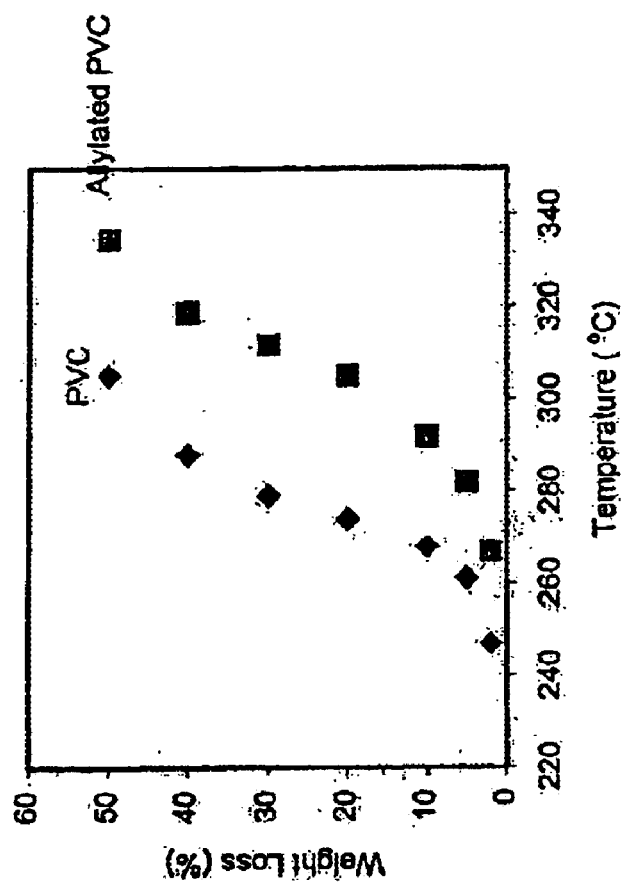
FIG. 2 is a thermal gravimetric analysis of an allylated pvc(10° C./min under nitrogen).

The thermal stability of allylated poly(vinyl chloride) was studied by thermal gravimetric analysis (TGA) in air and N$_2$. TABLE II lists representative thermal stability data. The thermal stability of allylated poly(vinyl chloride) as measured by weight loss was improved by about 15° C. at low weight loss, and by more than 30° C. at about 20 to about 30 percent weight loss. Dehydrochlorination is more rapid in the presence of oxygen. Indeed, the thermal stability of allylated poly(vinyl chloride) is much higher in N$_2$ as illustrated by the data in FIG. 2.

In allylated poly(vinyl chloride), the active chlorines are replaced by the more stable C—C bonds.

In yet another embodiment of the present invention, poly (vinyl chloride) is reacted with one or more unsaturated hydrocarbon dienes wherein the dienes become pendant groups on the poly(vinyl chloride) chain similar to the allyl functionality disclosed and described hereinabove. Poly (vinyl chloride) or copolymers thereof utilized in this embodiment can be the same as those described hereinabove and are fully incorporated by reference. The pendant diene or poly(dienes) have unsaturated or allylic end groups which can be reacted in a similar manner as described above to contain end groups such as epoxy, silyl, or hydroxy.

The dienes utilized in, the present invention generally have a total from about 4 to about 18 carbon atoms. The dienes can be conjugated or non-conjugated, branched or linear. Examples of suitable non-conjugated dienes include, but are not limited to, 2-methyl-1,5 hexadiene, and other dienes which can be represented by the following formula:

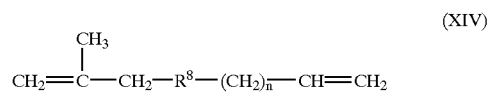

(XIV)

where R$^8$ is an alkylene moiety having from 0 (nonexistent) to about 2 carbon atoms, and desirably is 0 or 1 carbon atom and wherein n is an integer from 0 to about 10, and preferably from 1 to about 5.

The diene monomers are reacted with poly(vinyl chloride) to form multiple grafted oligomers having a low degree of polymerization and allyl functionality. That is, the diene monomers are reacted in the presence of a Friedel-Crafts catalyst as set forth hereinabove and form multiple grafted pendant sites on the backbone of the poly(vinyl chloride) wherein each pendant site is an oligomer containing repeat groups derived from the diene monomers with each repeat group generally having an unsaturated or allylic end group. The number of repeat groups per oligomer is generally from about 1 to about 20, desirably from about 3 to about 10, and preferably from about 3 to about 7. The number of grafted oligomers derived from a conjugated diene for each poly(vinyl chloride) chain is generally from about 1 to about 20, desirably from about 1 to about 5 or 10, and preferably from about 1 to about 3.

Desirably, the grafting of the diene from the poly(vinyl chloride) is conducted in the presence of an inert gas such as nitrogen, helium, argon, neon, and the like, in order to graft under controlled, inert or non-reactive conditions.

Poly(vinyl chloride), as defined hereinabove, is placed into solution using appropriate polar solvents as set forth above with respect to the allylation reaction. Enough solvent is utilized so that poly(vinyl chloride) is present in solution in an amount generally from about 0.5 to about 5.0, desirably from about 0.6 to about 3.0, and preferably from 0.75 to about 1.25 percent by weight based on the total weight of poly(vinyl chloride) and solvent.

The solution of poly(vinyl chloride) is cooled in a reaction vessel. Suitable temperatures generally range from about 0° C. to about minus 90° C. and desirably from about minus 40° C. to about minus 80° C.

At least one of the above described dienes, e.g. 2-methyl-1,5 hexadiene, is added to the cooled solution in an amount generally from about 0.1 mol/L to about 1.5 mol/L, desirably from about 0.2 mol/L to about 1.0 mol/L, preferably from about 0.3 mol/L to about 0.8 mol/L (moles per liter) of solution (solvent and poly(vinyl chloride)).

One or more Friedel-Crafts acids as defined hereinabove, e.g. $Et_2AlCl$ are also added to the solution with the amount of Friedel-Crafts acid utilized generally is from about $1\times10^{-2}$ to about $10\times10^{-2}$ moles per liter, desirably from about $2\times10^{-2}$ to about $8\times10^{-2}$ moles per liter, and preferably from about $3\times10^{-2}$ to about $6\times10^{-2}$ moles per liter of solution.

The reaction solution is mixed in any suitable container, vessel, etc. and is allowed to proceed generally from about 5 minutes to about 60 minutes and desirably from about 10 minutes to about 50 minutes, thus forming the poly(vinyl chloride) having multiple long chain unsaturated oligomers grafted thereon. The reaction is then terminated with an alcohol having from 1 to 5 carbon atoms or an amine, utilizing an excess to precipitate the grafted poly(vinyl chloride). Suitable alcohols include methanol, ethanol, and propanol. Methanol and ethanol are preferred.

The grafted poly(vinyl chloride) is extracted with hexane or other hydrocarbons to separate the grafted poly(vinyl chloride) from the ungrafted polydiene. If desired, the long chain oligomer grafted poly(vinyl chloride) can be purified by re-dissolving in tetrahydrofuran, cyclohexanone, or any other suitable solvent, and centrifuged for any desirable amount of time, such as approximately one hour, to remove residues such as small amounts of metal oxide.

The mechanism of poly(vinyl chloride) grafting wherein the diene is 2-methyl-1,5-hexadiene is believed to be:

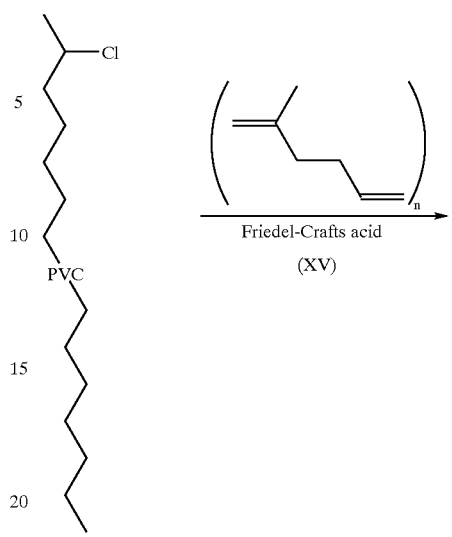

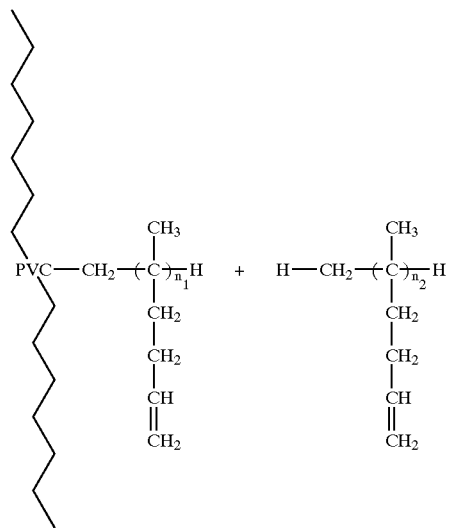

Wherein n, as noted above is from about 1 to about 20 and $n_1+n_2=n$.

EXAMPLE

PVC Containing Grafted Unsaturaterd Oligomers Derived from a Diene

Grafting of poly(2-methyl-1,5-hexadiene) from poly(vinyl chloride) was carried out in a stainless steel dry box. A 200 mL flask, equipped with mechanical stirrer, was charged with 80 mL $CH_2Cl_2$ solution of poly(vinyl chloride) (1 wt %), and was cooled to −70° C. and −50° C. 2-methyl-1,5-hexadiene (0.5 mol/L) and Friedel-Crafts acid ($TiCl_4$ or $Et_2AlCl$, $4.5\times10^{-2}$ mol/L) were added, and the charge was stirred for 45 minutes. Methanol (~10 mL) was added to terminate the reaction. The grafted poly(vinyl chloride) along with the homopolymer were precipitated with excess methanol, and extracted with hexane to separate the grafts from homopolymer. The homopolymer (in hexane solution) was dried in a vacuum oven. The grafts are redissolved in THF, centrifuged for 1 hour to remove metal oxide residues and dried in a vacuum oven at room temperature.

$^1$H NMR spectroscopy was used to confirm the structure of the PVC-g-poly(2-methyl-1,5-hexadiene). Integrating and correlating the characteristic resonances of the unsaturated function (i.e., the terminal protons in the —CH$_2$CH═CH$_2$ group) in the 5.65–5.95 ppm range with respect to the resonances at ~4.5 ppm (associated with the —CH$_2$CH(Cl)—group) gives the amount of allyl group content. According to this evidence, multiple allyl groups were attached to the poly(vinyl chloride).

The above described poly(vinyl chloride) grafted diene oligomers having multiple repeat groups generally terminated with an unsaturated end group can be reacted to convert the end group to other functional groups such as hydroxyl groups, epoxy groups, etc. in generally the same manner as set forth above, with regard to the allylated poly(vinyl chloride) and the same is hereby incorporated by reference.

By way of example, hydroxyl groups can be added as follows. A desired amount of poly(vinyl chloride) grafted with a diene is placed into solution with any of the suitable halogenated hydrocarbon polar solvents noted hereinabove. The poly(vinyl chloride) grafted with the diene is present in solution in an amount generally from about 0.1 to about 10, desirably from about 0.5 to about 6, and preferably from about 1 to about 3 percent by weight based on the total weight of the multiple oligomer grafted poly(vinyl chloride) and solvent. Then, hydroboration/oxidation is carried out with BH$_3$(a boron hydride complex) and THF (tetrahydrofuran). The amount of the boron containing compound added to the reaction mixture is generally a stoichiometric excess relative to the allyl or unsaturated groups of the multiple pendant oligomers such as from about 1 to about 20 and desirably from about 1 to about 10 equivalent weight. The reaction is carried out in an inert atmosphere, such as in the various inert compounds and gasses as stated hereinabove, with nitrogen being preferred. Reaction temperatures generally range from about minus 30° C. to about 45 or 50° C. with from about minus 10° C. to about 20° C. being desired. The reaction mixture is allowed to react for a sufficient amount of time, which can vary depending upon the reaction temperature and particular reactants. For example, a reaction mixture can be reacted at room temperature with 9-BBN or at 0° C. with the BH$_3$.THF, from one to about several hours. Subsequently, an oxygen containing compound is added which will react with the reactant to form a hydroxyl group. Such compounds include the various aqueous alkali hydroxyl compounds such as KOH and NaOH in conjunction with hydrogen peroxide. This reaction is carried out at temperatures generally below 45° C. and allowed to react for a sufficient amount of time ranging from minutes to a few hours. The formed aqueous phase is separated from the organic layer phase and the organic layer phase containing the grafted oligomer is washed several times with water and dried over a drying agent or desiccant such as magnesium sulfate. After filtration of the product, the solvent is evaporated by heating and the poly(vinyl chloride) grafted diene oligomer having hydroxyl end groups is dried under a vacuum at room or elevated temperatures. The percentage of unsaturated groups which are hydroxylated is essentially quantitative.

Similar to the epoxidation of the allylic poly(vinyl chloride) described hereinabove, the poly(vinyl chloride) containing a plurality of unsaturated oligomers thereon such as those derived from one or more dienes can be epoxidized in the following manner. A desired amount of the multiple grafted pendant sites on the backbone of poly(vinyl chloride), wherein each pendant site is an oligomer containing repeat groups such as that derived from diene monomers, is dissolved in a halogen containing hydrocarbon polar solvent such as noted hereinabove, for example methylene chloride or methyl chloride. Enough solvent is utilized so that the grafted poly(vinyl chloride) is present in solution in an amount generally from about 0.1 to about 10, desirably from about 0.5 to about 5, and preferably from about 1 to about 2 percent by weight based on the total weight of poly(vinyl chloride) and solvent. A peracid, i.e., a molecule comprising a —COOOH group, such as m-chloroperbenzoic acid (preferred), peracetic acid (preferred), perpropionic acid, trichloroperacetic acid, trifluoroperacetic acid, or a combination thereof, is then added to the allylated poly (vinyl chloride) solution. The peracid is added in amounts from about 2 to about 10 times in excess of stoichiometric ratio of the allylated poly(vinyl chloride). The reaction is carried out under normal atmospheric conditions. The reaction temperature may be generally from about –20° C. to about 80° C., desirably from about –10° C. to about 50° C, and preferably the reaction is run at ambient room temperature, i.e., from about 10 to about 30° C. The reaction is allowed to proceed while preferably stirred, generally for about 10 minutes to about 4 hours and desirably from about 20 minutes to 1 hour.

The product is precipitated with an alcohol having from about 1 to about 5 carbon atoms, such as methanol. The precipitated product can be washed sequentially with 5% aqueous sodium bicarbonate, distilled water and methanol. The solvent is evaporated and the product is dried, such as in a vacuum oven, at room temperature. The product contains said one or more pendant diene oligomers generally having an epoxy

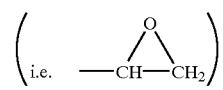

group.

Silyl groups can be added to the poly(vinyl chloride) containing a plurality of unsaturated oligomers through hydrosilation. A desired amount of grafted poly(vinyl chloride) is placed into solution with any of the solvents noted hereinabove. The grafted poly(vinyl chloride) is present in solution in any desired amount such as from about 0.1 to about 10, desirably from about 0.5 to about 6, and preferably from about 1 to about 3 percent by weight based on the total weight of poly(vinyl chloride) and solvent as set forth above, e.g. 1,2-dichloroethane. A few drops of Karstedt's catalyst and excess R$_3$SiH is added to the solution. R can be an alkyl group having from 1 to about 10 carbon atoms or an alkoxy group having from about 1 to about 10 carbon atoms. The amount of the silicon containing compound added to the reaction mixture was generally a stoichiometric excess relative to the pendant allyl group such as from about 1 to about 20 and desirably from about 1 to about 10 molar equivalent. The charge was refluxed preferably for about 0.5 to about 6 hours. The hydrosilated poly(vinyl chloride) was precipitated with an alcohol, washed sequentially with hexane distilled water and an alcohol, and dried in a vacuum oven at room or elevated temperature.

Grafted PVC Copolymers

The poly(vinyl chloride) containing hydroxyl terminated multiple grafted oligomers such as derived from a diene, or other hydroxyl terminated alkyl such as derived for the allylic group, described hereinabove, can be utilized to form numerous grafted polymers on the poly(vinyl chloride) backbone through a reaction with the hydroxyl group in a manner known to the art and to the literature. For example, see Kennedy and Ivan, Designed Polymers by Carbocationic Macromolecular Engineering: Theory and Practice, Hanser Publishers 1992. Grafted polymers include polyesters, polyurethanes, polycarbonates, polyethers, polyamides (nylon), and the like. The grafted polymer can either be pre-formed, that is reacted and contain an end group which is reactive with the one or more pendant hydroxyl groups off of the poly(vinyl chloride) backbone, or the various polymers can be formed in situ by reacting monomers which form the desired polymer in the presence of a poly(vinyl chloride) containing the pendant hydroxyl function with the hydroxyl group entering into the reaction and thus forming a grafting site for the polymer being formed. The reaction conditions for forming the prepolymer or reacting the monomers in situ are well known to the art and to the literature such as set forth in "Principles of Polymerization", $3^{rd}$ Edition, 1991, Odian, John Wiley & Sons, Inc., New York, N.Y. which is hereby fully incorporated by reference.

The polyesters which can be utilized in the present invention are well known to the art and to the literature as is the preparation thereof. Polyesters can be produced by direct esterification of a diacid with a diol or self-condensation of a hydroxy carboxylic acid. Since polyesterification, like many step polymerizations, is an equilibrium reaction, water must be continuously removed to achieve high conversion and high molecular weights. The polyesters are made from aliphatic dicarboxylic acids, aliphatic anhydrides, or aromatic acids, etc., and glycols and acids can be utilized as well. The glycols generally have from 2 to 20 carbon atoms with specific examples including ethylene glycol, propylene glycol, 1,3-butylene glycol, 1,4-butylene glycol, pentane diol, hexane diol, cyclohexanedimethanol dipropylene glycol, diethylene glycol, pinacol, and the like. Preferred glycols generally include ethylene glycol, propylene glycol, or butylene glycol. Generally, aromatic polyesters are preferred such as polyethylene-terephthalate (PET), polytrimethyleneterephthalate (PTT), polybutyleneterephthalate (PBT), polyethyleneisophthalate, and polybutylenenapthalate.

Polyester block copolymers can also be utilized and suitable polyester block copolymers include segmented polyester-polyether and the like. These block copolymers contain at least one block of a polyester and at least one rubbery block such as a polyether derived from glycols having from 2 to 6 carbon atoms, e.g., polyethylene glycol, or from alkylene oxides having from 2 to 6 carbon atoms. A preferred block polyester-polyether polymer is polybutyleneterephthalate-b-polytetramethylene glycol which is available as Hytrel from DuPont.

The weight average molecular weight of the various polyesters generally range from about 5,000 or 10,000 to about 150,000 or 200,000 with from about 25,000 to about 100,000 being preferred. An example synthetic mechanism of the reaction of hydroxylated poly(vinyl chloride) and polyester is as follows:

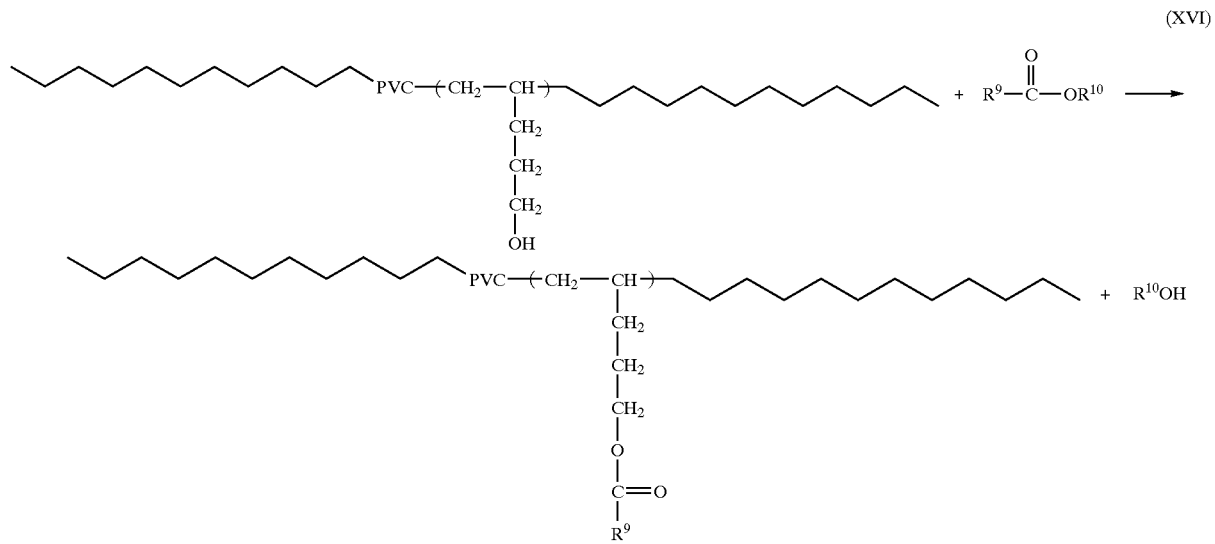

(XVI)

such are well known to the art and to the literature as is the preparation thereof. Naturally, the polymerization of the polyester as a graph of the poly(vinyl chloride) backbone is through reaction of the hydroxyl group of the oligomer or alkyl with a dicarboxylic acid, etc. The aliphatic dicarboxylic acids and anhydrides have from about 2 to about 20 and desirably from about 3 to about 15 carbon atoms, with specific examples including carbonic acid, malonic acid, succinic, glutaric acid, adipic acid, pimelic acid, suberic acid, azelaic acid, sebacic acid, the anhydride counterparts thereof, and the like. The aromatic diacids are generally preferred and contain from about 8 to about 20 and preferably from about 8 to about 15 carbon atoms. Examples of aromatic diacids include phthalic acid, isophthalic acid, terephthalic acid, and the like. Mixtures of all of the above Wherein $R^9$ is a polyester and $R^{10}$ is an alkyl group.

The polycarbonates which can be utilized in the present invention are generally characterized by the —OCOO— hetero chain unit and are well known to the art and to the literature as is the preparation thereof. Generally any type of polycarbonate can be utilized. The polycarbonates can be made from aromatic monomers, aliphatic monomers, or mixtures thereof. Examples of such polycarbonates and the preparation thereof are set forth in the Encyclopedia of Polymer Science and Engineering, Volume 11, page 648–718, D. Freitag et al, John Wiley & Sons, 1988, which is hereby fully incorporated by reference. Although aliphatic polycarbonates can be utilized, they are generally less important than aromatic polycarbonates. Various starting materials for aliphatic polycarbonates are diols and carbonates, as for example diethyl or diphenyl carbonate. Aromatic polycarbonates are generally preferred and are prepared by the reaction of bisphenols with carbonic acid derivatives. The bisphenol is generally bisphenol A, that is 2,2-bis(4-hydroxyphenyl) propane. The carbonic acid derivative can be phosgene or diphenyl carbonate. The molecular weight of the various polycarbonates is generally from about 10,000 to about 200,000 and desirably from about 15,000 to about 35,000, 50,000 or 75,000. The preparation and polymerization of polycarbonates is well known to the art and to the literature. With respect to grafting a polycarbonate onto the hydroxyl terminated oligomer or alkyl pendant from the poly(vinyl chloride) backbone, as by reaction of carbonic acid or carbonic acid derivative with the pendant hydroxyl group of the poly(vinyl chloride). The preparation of various polycarbonates is described in "Principles of Polymerization", $3^{rd}$ Edition, Odian, 1991, John Wiley and Sons, Inc., New York, N.Y. which is hereby incorporated by reference.

The polyethers which can be utilized in the present invention are well known to the art and to the literature and include but are not limited to cyclic ethers such as those made from oxirane, oxetane, oxolan and oxane.

The polyurethanes which can be utilized in the present invention are well known to the art and literature as is the preparation thereof. Generally, the polyurethane is made from a polyol intermediate and an equivalent amount of polyisocyanate. The pendant grafted polyurethane can be made by reacting an isocyanate with the hydroxyl end group of the oligomer or alkyl pendant group on the backbone of the poly(vinyl chloride), in a manner known to the art and to the literature.

The polyol intermediate is generally a liquid polyether polyol or a polyester polyol, or combinations thereof having a number average molecular weight of from about 400 to about 10,000 with from about 500, or about 1,000 or about 2,000 to about 4,000 or about 7,000 being preferred. A wide range of polyether or polyester polyols can be used. Polyether polyols are generally made by reacting an alkylene oxide having from 2 to about 10 carbon atoms such as propylene oxide with a strong base such as potassium hydroxide, preferably in the presence of water, glycols and so forth. Polyethers having a highly branched chain are readily prepared from alkylene oxides and initiators having an active hydrogen functionality greater than 2. The higher functional initiators that are useful with the alkylene oxides described above include polyols, polyamines and amino alcohols having a total of three or more reactive hydrogen atoms on hydroxyl and primary or secondary amino groups and generally having up to 12 carbon atoms.

Other polyethers which can be utilized are those which are produced as by polymerization of tetrahydrofuran or epoxides (such as ethylene oxide, propylene oxide, butylene oxide, styrene oxide, or epichlorohydrin), or by addition of epoxide compounds (preferably ethylene oxide or propylene oxide), alone, in a mixture, or in succession, to starting components with reactive hydrogen atoms such as water, polyhydric alcohols, ammonia or polyfunctional amines.

Polyester polyols are formed from the condensation of one or more polyhydric alcohols having from 2 to about 20 carbon atoms with one or more aliphatic or aromatic polycarboxylic acids having from 2 to 20 carbon atoms. Examples of suitable polyhydric alcohols include the following: ethylene glycol, propylene glycol such as 1,2-propylene glycol and 1,3-propylene glycol, butanediol; pentanediol; hexanediol; dodecanediol; octanediol; chloropentanediol, glycerol monallyl ether; glycerol monoethyl ether, diethylene glycol; 2-ethylhexanediol-1,4; cyclohexanediol-1,4; 1,2,6-hexanetriol; 1,3,5-hexanetriol; 1,3-bis-(2-hydroxyethoxy)propane and the like. Triols, tetrols, and the like can be used to form crosslinked polyurethanes. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3'-thiodipropionic acid; succinic acid; adipic acid; malonic acid, glutaric acid, pimelic acid, sebacic acid, cyclohexane-1,2-dicarboxylic acid; 1,4-cyclohexadiene-1,2-dicarboxylic acid; 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid.

Polyesters from lactones (for example epsilon-caprolactone) and polyacetals, polycarbonates or polybutadienes containing terminal hydroxyl groups are also suitable.

The equivalent ratio of the polyisocyanate utilized to make the prepolymer to the hydroxyl containing polyol intermediate (NCO/OH) is generally from about 0.90 to about 1.10 and preferably from about 0.95 or about 0.98 to about 1.02 or about 1.05. The polyisocyanates generally have the formula $R(NCO)_n$ where n is an integer of 2, 3 or 4 with approximately 2 being preferred. However, it is to be understood that since combinations of various polyisocyanates can be utilized, the equivalent amount of isocyanate can vary and often is not an integer. R is an aliphatic group having from about 2 to about 20 carbon atoms with from about 6 to about 15 carbon atoms being preferred, an aromatic group including an alkyl substituted aromatic having from about 6 to about 20 carbon atoms with from about 6 to about 15 carbon atoms being preferred, or combinations thereof. Examples of suitable polyisocyanates include 1,6-diisocyanato hexane, 2,2,4- and/or 2,4,4-trimethyl hexamethylene diisocyanate, p- and m-tetramethyl xylene diisocyanate, dicyclohexylmethane-4,4'-diisocyanate (hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate, isopropylene-bis-(p-phenyl isocyanate) and sulfone-bis-(p-phenyl isocyanate). Also useful are diisocyanates prepared by capping low molecular weight, that is less than 300, diols, ester diols or diamines with diisocyanates, such as the reaction products of one mole of 1,4-butanediol or bis-(4-hydroxybutyl)-succinate (molecular weight=262) with two moles of hexamethylene diisocyanate. Any combination of diisocyanates can also be employed. Combinations of slower reacting aliphatic with faster reacting aromatic diisocyanates can be advantageously used. Examples of still other isocyanates include 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 4,4'-diphenyidiisocyanate, 4,6-dimethyl-1,3-phenylenediisocyanate, 1,10-anthracenediisocyanate, 4,4'-diisocyanatodibenzyl, 3,3-dimethyl-4,4'-diisocyanatodiphenylmethane, 2,6-dimethyl-4,4'-diisocyanatodiphenyl and others and mixtures of the same. TDI or isophorone diisocyanate are desirably utilized. The various diphenylmethane diisocyanates (MDI) and mixtures of MDI with polymeric MDI having an average isocyanate functionality of from about 2 to about 3.2 are preferred. The preparation of various polyethers and polyurethanes is described in "Principles Of Polymerization", 3$^{rd}$ Edition, 1991, Odian, John Wiley & Sons, Inc., New York, N.Y. which is hereby fully incorporated by reference.

Numerous fillers can be utilized in the urethane prepolymer component. The fillers are generally mineral (inorganic), and in a powdery form and serve to adjust the urethane prepolymer adhesive component viscosity as well as to lower the cost thereof. The fillers can at times impart improved adhesion. Examples of specific fillers include ground mica, talc, kaolin clay, calcium carbonate, calcium sulfite, colloidal silica, wollastonite, ballotini, hollow glass microspheres, glass, carbon and graphite fibers, various metallic oxides such as zinc, titanium, zirconium, and the like, ground quartz, various metallic silicates, metallic powders such as lead, aluminum, bronze, and the like. A preferred filler is talc. The amount of filler is generally an effective amount to produce a viscosity so that the prepolymer component can be readily pumped through processing equipment such as adhesive meter-mixing machines. Such an effective amount is usually from about 5 to about 100 parts by weight and preferably from about 20 to about 50 parts by weight per 100 parts by weight of the prepolymer.

Another group of polymers which can be covalently attached to the pendant oligomers or alkyls of the poly(vinyl chloride) backbone containing the hydroxyl functional end group are the various nylons or polyamides. Polyamides are generally made by a condensation reaction of a diamine having from about 4 to about 20 carbon atoms with a dicarboxylic acid, either aliphatic or aromatic, having from about 4 to about 20 carbon atoms. Nylons can also be made from the ring opening polymerization of internal amides having a total of from about 4 or 5 to about 10 or 12 carbon atoms in the ring. The formation and polymerization of nylons and polyamides are well known to the art and to the literature. Nylons can be formed by reacting a dicarboxylic acid with the pendant hydroxyl group of the oligomer located on the backbone of the poly(vinyl chloride) polymer in any conventional manner as also known to the art and to the literature. Subsequently, the remaining acid end group can be reacted with a diamine, etc. Suitable nylons include nylon 6, nylon 66, nylon 69, nylon 610, nylon 612, nylon 11, nylon 12, nylon 46, and the like. The molecular weight of the nylon can vary over a wide range such as a number average molecular weight of from about 1,000 to about 30,000 and desirably from about 5,000 to about 20,000. The preparation of various polycarbonates is more fully described in "Principles of Polymerization", 3$^{rd}$ Edition, Odian, 1991, John Wiley & Sons, Inc., New York, N.Y. which is hereby fully incorporated by reference.

As set forth above, the poly(vinyl chloride) copolymers containing multiple grafted chains of polyester, polycarbonate, polyether, polyurethane, or polyamide as noted above, can be prepared in various conventional manners known to the literature and to the art including the reaction of the pendant hydroxyl group with monomers which form the various noted polymers or with a reactive end group of a preformed polymer.

Such above noted poly(vinyl chloride) copolymers containing the multiple grafted chains of various polymers can also contain various conventional additives well known to the art and to the literature in conventional amounts also known to the art and to the literature such as, for example, fillers, both organic and inorganic, plasticizers, pigments, antioxidants, antiozonants, and the like.

The above noted copolymers of poly(vinyl chloride) and the various pendant polymer chains thereon are useful as compatibilizing agents such as for blends of poly(vinyl chloride) with various polymers containing atoms other than hydrogen or carbon, such as poly(vinyl chloride) with polyester, blends of poly(vinyl chloride) with polycarbonates, blends of poly(vinyl chloride) with polyethers, blends of poly(vinyl chloride) with polyurethanes, blends of poly(vinyl chloride) with polyamides, and the like. The amount of the above noted poly(vinyl chloride)-grafted polymers when used as a compatibilizing agent for the above noted blends, or for blends of polymers containing at least one or preferably at least two of the polymers making up the poly(vinyl chloride) graft copolymer, will vary with regard to the particular type of blend system. Such amounts can be readily established. Generally, the amount of the compatibilizing agent is from about 0.2 to about 20 parts by weight and desirably from about 1 to about 10 parts by weight for every 100 parts by weight of the blended polymers.

In accordance with the patent statutes, the best mode and preferred embodiment have been set forth, and the scope of the present invention is not limited thereto, but rather by the scope of the attached claims.

What is claimed is:

1. A poly(vinyl chloride)-g-non-conjugated diene composition comprising:

the reaction product of a poly(vinyl chloride) solute and at least one non-conjugated hydrocarbon diene solute having a total from 5 to about 18 carbon atoms, wherein said at least one non-conjugated hydrocarbon diene is either a linear chain or a branched chain.

2. The poly(vinyl chloride)-g-non-conjugated diene composition according to claim 1, wherein said at least one non-conjugated hydrocarbon diene has the formula:

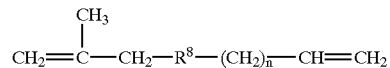

wherein R$^8$ is nonexistent or an alkylene having from 1 to about 2 carbon atoms, and wherein n is 0 or an integer from 1 to about 10.

3. The poly(vinyl chloride)-g-non-conjugated diene composition according to claim 2, wherein said at least one non-conjugated hydrocarbon diene is 2-methyl-1,5-hexadiene.

4. The poly(vinyl chloride)-g-non-conjugated diene composition according to claim 1, wherein said at least one non-conjugated hydrocarbon diene is grafted on the backbone of said poly(vinyl chloride), wherein said at least one non-conjugated hydrocarbon diene is an oligomer having from 2 to about 20 repeat groups, and wherein the number of said grafted oligomers per poly(vinyl chloride) chain is from 1 to about 20.

5. The poly(vinyl chloride)-g-non-conjugated diene composition according to claim 4, wherein said repeat groups of said at least one non-conjugated hydrocarbon diene oligomer have an unsaturated end group.

6. A poly(vinyl chloride)-g-non-conjugated diene copolymer comprising:

a poly(vinyl chloride) graft copolymer chain having at least one repeat unit of the formula:

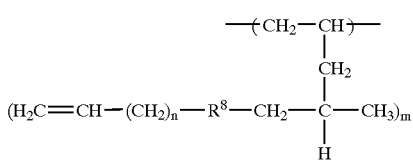

per chain of said graft copolymer, wherein $R^8$ is nonexistent or an alkylene having from 1 to about 2 carbon atoms, wherein n is 0 or an integer from 1 to about 10, and wherein m is an integer from 1 to about 20, said pendant portion of said formula is derived from a non-conjugated diene.

7. A poly(vinyl chloride)-g-non-conjugated diene copolymer according to claim 6, wherein 1 to about 20 of said repeat units are present per said poly(vinyl chloride) graft copolymer chain.

8. A poly(vinyl chloride)-g-non-conjugated diene copolymer according to claim 7, wherein said pendant portion of said formula is derived from 2-methyl-1,5 hexadiene.

9. A poly(vinyl chloride)-g-non-conjugated diene copolymer according to claim 7, wherein m is about 3 to about 10 and wherein the number of said repeat units per said graft copolymer chain is from 1 to about 10.

10. A poly(vinyl chloride)-g-non-conjugated diene copolymer according to claim 9, wherein m is about 3 to about 7, and wherein the number of said repeat units per said graft copolymer chain is from 1 to about 3.

11. A poly(vinyl chloride)-g-non-conjugated diene copolymer according to claim 7, wherein m is about 3 to about 7, and wherein from 1 to about 10 of said repeat units are present per said poly(vinyl chloride) graft copolymer chain.

12. A poly(vinyl chloride)-g-non-conjugated diene copolymer according to claim 11, wherein from 1 to about 3 of said repeat units are present per said poly(vinyl chloride) graft copolymer chain.

* * * * *

UNITED STATES PATENT AND TRADEMARK OFFICE
CERTIFICATE OF CORRECTION

PATENT NO. : 6,831,133 B2
DATED : December 14, 2004
INVENTOR(S) : Kennedy et al.

It is certified that error appears in the above-identified patent and that said Letters Patent is hereby corrected as shown below:

Column 30,
Line 45, "wherein n is O" should read -- wherein n is 0 --

Column 31,
Line 21, "1,5 hexadiene" should read -- 1,5-hexadiene --

Signed and Sealed this

Seventeenth Day of May, 2005

JON W. DUDAS
*Director of the United States Patent and Trademark Office*